UNITED STATES PATENT OFFICE.

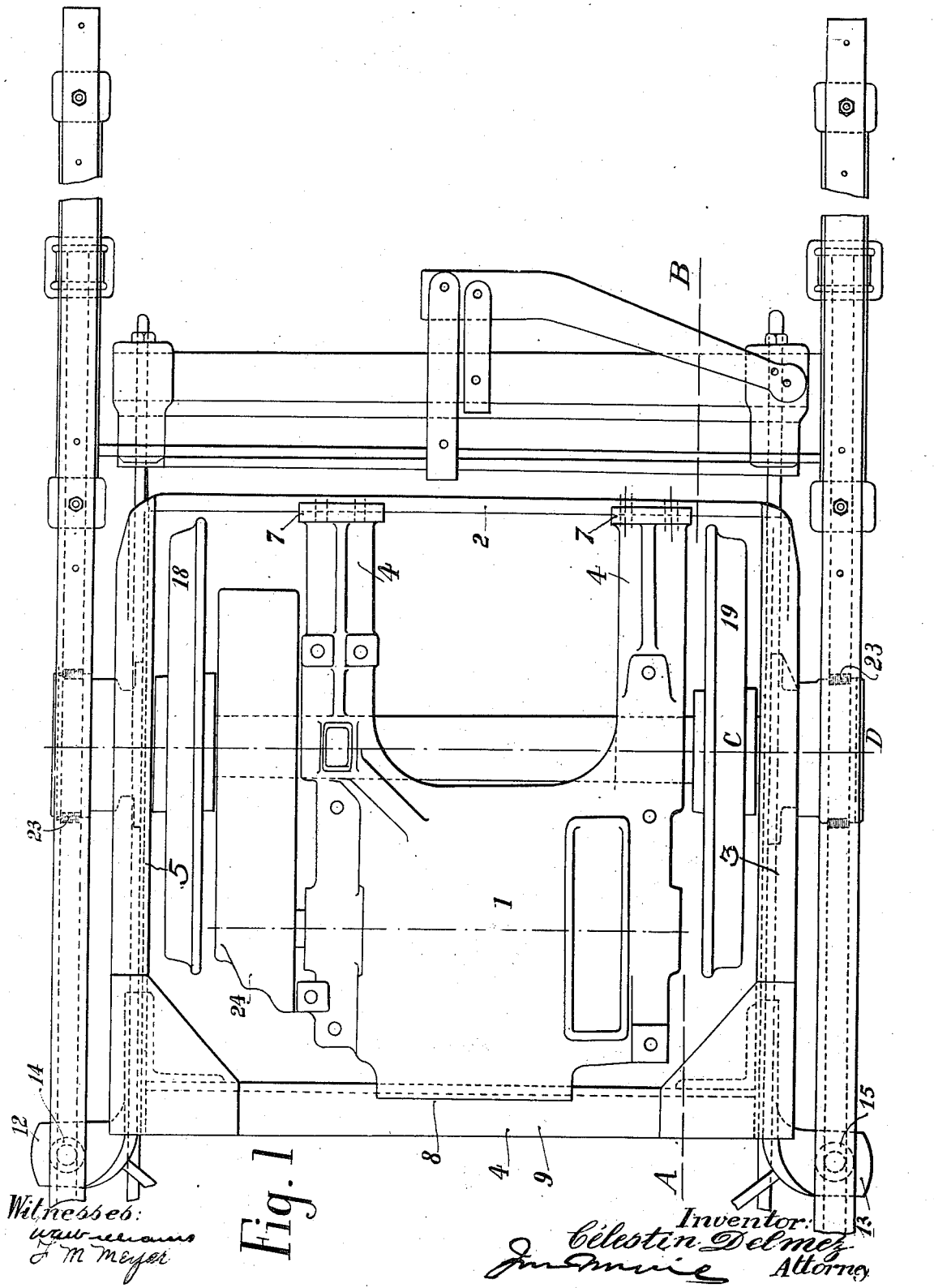

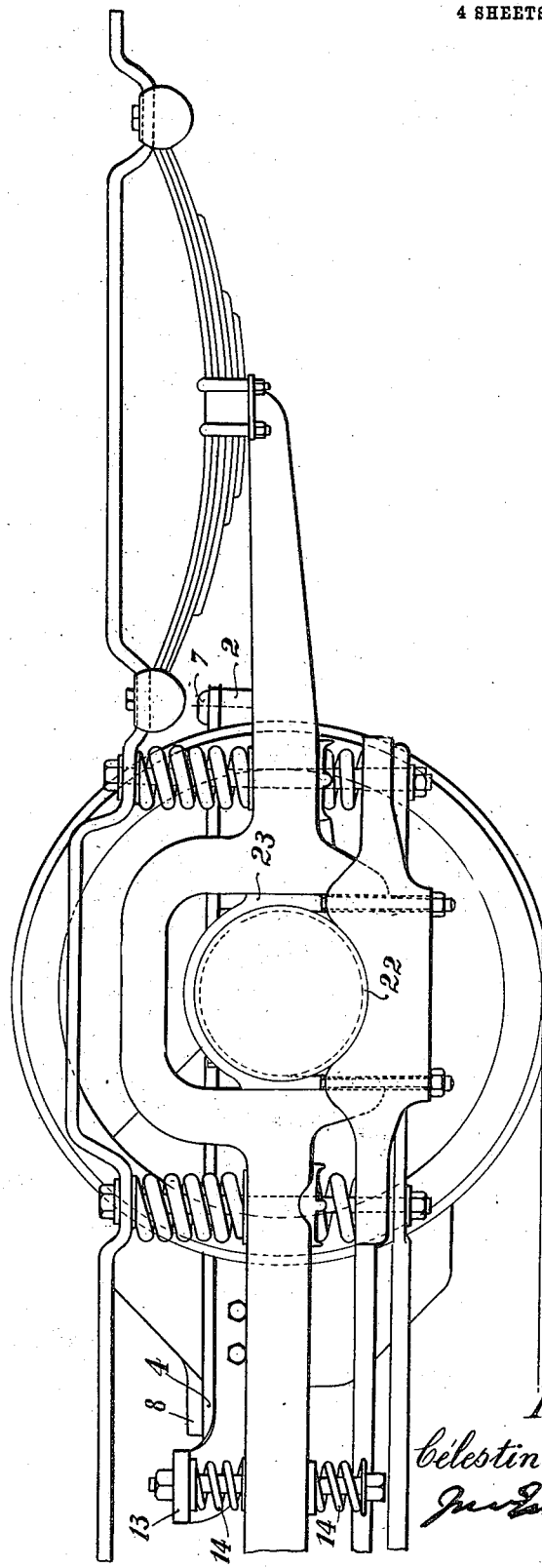

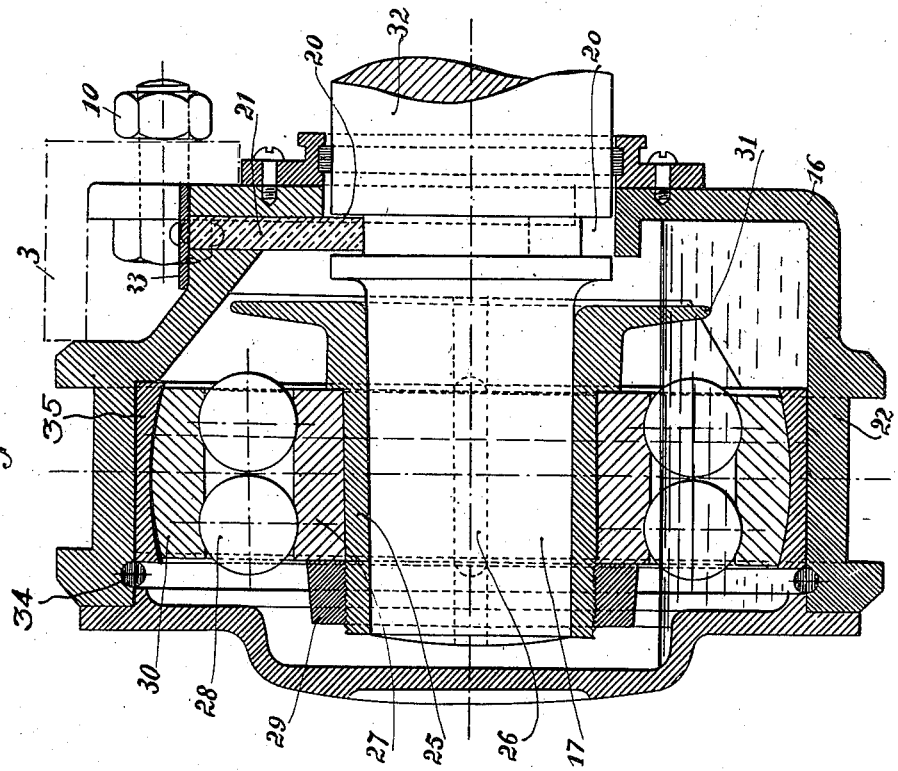

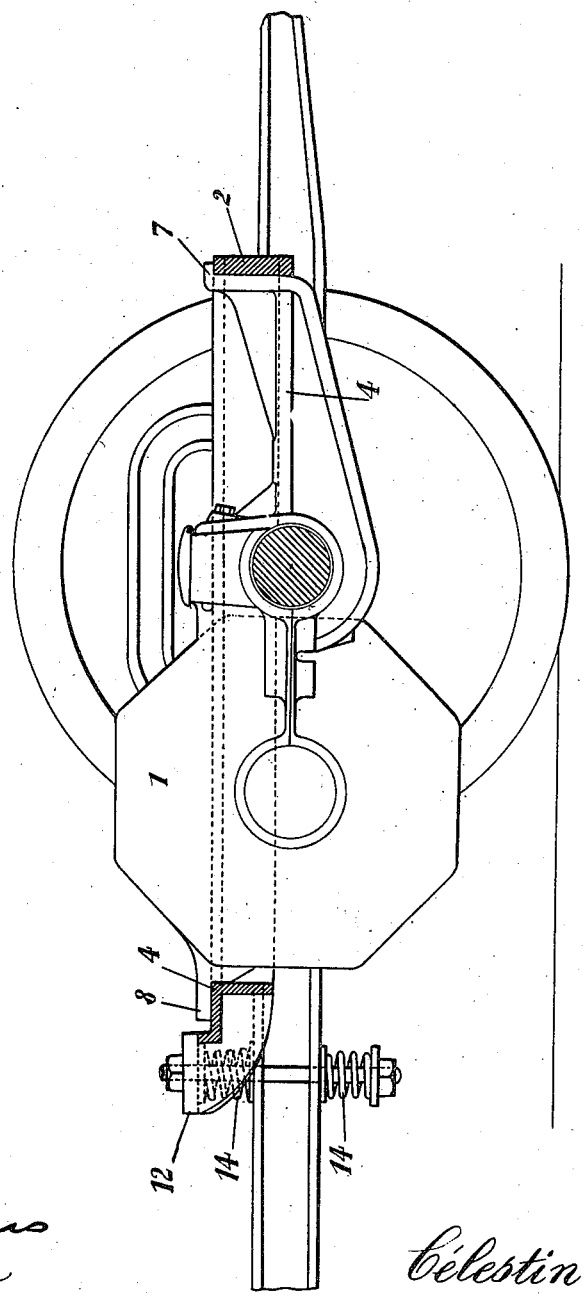

CELESTIN DELMEZ, OF ANTWERP, BELGIUM.

SUSPENSION DEVICE OF MOTORS ON TRAMWAY OR RAILROAD MOTOR-CARS.

1,136,779.

Specification of Letters Patent.

Patented Apr. 20, 1915.

Application filed July 17, 1913. Serial No. 779,570.

*To all whom it may concern:*

Be it known that I, CELESTIN DELMEZ, a subject of the Belgian King, and resident of Antwerp, Belgium, have invented certain new and useful Improvements in Suspension Devices of Motors on Tramway or Railroad Motor-Cars, of which the following is a specification.

The present invention relates to a novel suspension device of motors on tramway or railroad motorcars in which the usual axle boxes are replaced by ball bearings.

It has been tried to replace the usual axle boxes by lubricating boxes with ball bearings, but such ball bearings form a ring or crown made of one single piece, so that the mounting of said ball bearings in the lubricating boxes and the lubricating boxes proper require a displacement of the wheel centers. On the other hand the ball or roller bearing boxes hitherto known have not worked satisfactorily because of the eccentrically and axially directed strains which caused the deformation and destruction of same.

The present improvement has for its object to do away with such drawbacks and to secure the invariability of the distance between the motor axis and the driving axle, that is to say between the axis of the toothed wheel keyed on the motor shaft and the axis of the pinion keyed on the wheel axle and also the parallelism of both toothed wheels, in order to secure a smoother running and consequently a smaller wear and tear and less noise. The suppression of the brasses of the axle bearings, independently of the fact that the construction is much more rational, provides great economical advantages consisting in the avoidance of repairs and replacing of said brasses so that it is no more necessary to repeatedly transfer the rolling stock to the service work shops where they have to stay for more or less time. Furthermore the cost of antifriction metal, bronze and the like, the salaries paid for said repairs and the like are avoided. Finally the axles of the vehicles are no more worn out at the places surrounded by the bearing brasses and any trouble for lubricating work is avoided.

The invention consists in securing the motor on a frame connected at one end with the ball bearing box of the axle journals, exteriorly with respect to the car wheels, at the other end to the truck frame with interposition of double acting springs, the ball bearing being arranged in such a manner that any eccentric or axial strain on the box during the running is suppressed.

The novel device is shown in the accompanying drawing, in which:

Figure 1 is a plan of the vehicle frame provided with the device. Fig. 2 is a corresponding lateral view partially in section. Fig. 3 is a vertical axial section on line C—D of Fig. 1. Fig. 4 is a vertical section on line A—B of Fig. 1.

The motor 1 is mounted on a rectangular frame 2, 3, 4, 5, to which it is secured by means of a flange 8, 9 connected with the part 4 of the frame and at the opposite side by means of flanges 6, 7, connected with the part 2.

Said frame is secured by means of bolts 10 to the ball bearing lubricating box 16 (Fig. 3) hereinafter described and the corners 12, 13 of the frame are connected with the vehicle frame, by double acting springs 14, 15 being interposed between both said frames, in order to deaden the strains resulting from the braking, the starting, the unevennesses of the track and the like.

Furthermore the motions of the motor, resulting from such strains ought to be guided around an axis coinciding with the wheel axle (which result has never been got until now). With this object in view the ball bearing boxes 16 of the journals are provided on the periphery with a circular groove or slide 22 in which smoothly slides a box yoke 23 which supports the whole weight of the car. Owing to such arrangement the invariability of the distance and the parallelism of the gear axis are secured.

The lubricating box 16 (Fig. 3) containing the ball bearing is constructed in such a manner that the eccentric and axial strains exerted on the box during the travel, are suppressed. With this object in view the axle journal 17 is surrounded by a sleeve 25 smoothly engaging said journal. A bolt secured on the journal extends through an oval slot 26 provided on the sleeve 25 in such a manner that the latter rotates together with the axle and freely slides in an axial direction with respect to the latter. On the sleeve 25 is mounted the inner ball race 27 of the ball bearing 28. Said ball race 27 is secured on the sleeve 25 by means of a nut 29 screwed on the outer side of the sleeve 25. The outer ball race 30 is maintained by means of a ring shaped spring 34 located in a circular groove and fixing the crown 35 in which is engaged the ball race 30. A circular flange 31 provided at the inner end of said sleeve, prevents the lubricating oil from being thrust against the inner wall of the box.

The lubricating box is furthermore provided with a device for conducting the electric current from the motor to the axle, the wheels and the rails, so that the current does not flow through the lubricating box, which would produce noxious electrolytic and calorific actions on the oil, the steel from which are made the balls and the races being of a composition offering some resistance to the passage of the current. With this object in view a groove 20 is provided between the journal 17 and the axle 32 and in said groove is freely engaged a forked piece 21 made of bronze of a high conductibility, constantly maintained in contact with the axle 32 by means of a spring 33. The electric current from the motor continuously flows through said fork to the axle without flowing through the ball bearing box.

Having now fully described my said invention, what I claim and desire to secure by Letters Patent, is:

1. A suspension device for motors on tramway and railroad motorcars comprising a truck, a frame on said truck, a motor secured on said frame, means for yieldingly securing said frame to the truck frame, a driving axle, journals on said axle, axle boxes on said journals, means for connecting said frame with said axle boxes, ball bearings in said axle boxes, means for supporting the truck frame on said axle boxes, means for preventing the eccentric and axial strains on said boxes.

2. A suspension device for motors on tramway and railroad cars, comprising a truck, a frame on said truck, a motor secured on said frame, means for yieldingly securing said frame to the truck frame, a driving axle, journals on said axle, axle boxes on said journals, means for connecting said frame with said axle boxes, a circular groove at the periphery of each of said axle boxes, a box yoke smoothly sliding in said groove and supporting the weight of the truck frame, means for preventing the eccentric and axial strains on said axle boxes.

3. A suspension device for motors on tramway and railroad cars, comprising a truck, a frame on said truck, a motor secured on said frame, means for yieldingly securing said frame to the truck frame, a driving axle, journals on said axle, axle boxes on said journals, means for connecting said frame with said axle boxes, ball bearings in said axle boxes, means for supporting the truck frame on said axle boxes, a sleeve surrounding said journal, an oval slot on said sleeve, a bolt secured on said journal and extending through said oval slot so that said sleeve rotates together with the journal and slides axially on same, a threaded portion at one end of said sleeve, an inner ball race, a nut screwed on said sleeve for securing said inner ball race onto said sleeve, an outer ball race, balls between both races, a ring shaped crown tightly engaged between the inner circular periphery of said axle box and said outer race, a circular trough shaped groove at the inner periphery of said axle box and adjacent one of the lateral sides of said crown, a ring shaped spring located within said groove and bearing on said crown, in order to firmly maintain said crown on the opposite lateral wall of said axle box and on the outer ball race.

4. A suspension device for motors on tramway and railroad cars, comprising a truck, a frame on said truck, a motor secured on said frame, means for yieldingly securing said frame to the truck frame, a driving axle, journals on said axle, axle boxes on said journals, means for connecting said frame with said axle boxes, ball bearings in said axle boxes, means for supporting the truck frame on said axle boxes, a sleeve surrounding said journal, an oval slot on said sleeve, a bolt secured on said journal, and extending through said oval slot so that said sleeve rotates together with the journal and slides axially on same, a threaded portion at one end of said sleeve, an inner ball race, a nut screwed on said sleeve for securing said inner ball race onto said sleeve, an outer ball race, balls between both races, a ring shaped crown tightly engaged between the inner circular periphery of said axle box and said outer race, a circular trough shaped groove at the inner periphery of said axle box and adjacent one of the lateral sides of said crown, a ring shaped spring located within said groove and bearing on said crown, in order to firmly maintain said crown on the opposite lateral wall of said axle box and on the outer ball race, a groove provided between said journal and said axle, a forked piece of bronze engaged in said groove and a spring applying said fork into said groove.

In testimony whereof I have hereunto set my hand in presence of two witnesses.

CELESTIN DELMEZ.

Witnesses:
G. McHERG,
HARRY SHERMAN.